Sept. 24, 1968 A. H. ELLSON ET AL 3,403,389

MAGNETIC INFORMATION STORAGE MATRIX EMPLOYING
PERMANENTLY MAGNETIZED INHIBITING PLATE
Filed March 28, 1963

INVENTORS
ALLAN H. ELLSON
ALEXANDER D. MAIN
BY
Frank R. [signature]
AGENT

United States Patent Office 3,403,389
Patented Sept. 24, 1968

3,403,389

MAGNETIC INFORMATION STORAGE MATRIX EMPLOYING PERMANENTLY MAGNETIZED INHIBITING PLATE

Allan Henry Ellson, Whyteleaf, and Alexander Donald Main, Sutton, England, assignors to North American Philips Company, Inc., New York, N.Y., a corporation of Delaware Filed Mar. 28, 1963, Ser. No. 268,668
Claims priority, application Great Britain, Apr. 16, 1962, 14,640/62
13 Claims. (Cl. 340—174)

This invention relates to information storage matrices employing magnetic cores.

Information storage matrices usually comprise annular cores of so-called square-loop ferrite material with a plurality of conductors passing through each core. The cores of such matrices are generally arranged in a number of parallel rows and parallel columns with a wire or wires passing through the cores of each row and a wire or wires passing through the cores of each column.

Some applications require a memory matrix in which a preset information pattern is stored, which pattern will not be destroyed by read operations. A simple method of permanently storing fixed information in a matrix would consist of merely removing those cores which are not used in the pattern of fixed information. However, the removal of cores suffers from the disadvantage that the pattern of fixed information cannot be changed in a given matrix and a separate matrix will be necessary for each change of fixed information.

U.S. patent application Ser. No. 808,383 filed on Apr. 23, 1959 and assigned to the preesnt invention describes a method of storing a preset information pattern in a memory matrix by saturating with discrete permanent magnetic fields those cores selected to be inoperative in accordance with the pattern of fixed information. That specification also describes apparatus comprising a matrix and permanent magnetic means for saturating only those cores that are to be rendered inoperative in accordance with the preset information pattern. In particular, the prior specification describes the use of an individual permanent magnet for saturating each selected core so as to cause it to give zero output.

The present invention provides an information storage matrivx employing an array of magnetic cores arranged in rows and columns in combination with a permanent magnetized inhibiting plate having an area equal to or greater than that of said array and having apertures corresponding to the cores which are to become inoperative, said plate having a north pole distributed over one of its faces with a south pole distributed over its other face and being juxtaposed with respect to said array, that is to say positioned side by side with the array, and arranged either close to or in contact with the cores. (As will be seen, the term "plate" is not used to imply hardness or rigidity.)

With such an arrangement, flux linking the front and back faces of the plate tends to concentrate at the outer edges of the plate and at its apertures, i.e. where the flux paths are shortest. Thus, unless a backing plate is used as described below, the outer edges of the plate must be well located beyond the edges of the core array so that the cores at the outer edges are not influenced by the peripheral fringing flux. The inhibiting flux is obtained at the apertures of the plate and for this reason such apertures are located where cores are to be inhibited by magnetic saturation. On the other hand the arrangement must be such that the relatively weak field near the unperforated parts of the plate is not sufficient to influence the operation of the corresponding cores.

As will be appreciated, it is very convenient to use a plate having a predetermined pattern of holes corresponding to the desired preset information pattern; in fact, one plate can readily be replaced by another (carrying a different pattern of perforations) without disturbing the matrix or its many connections. Thus the plates can be used somewhat like punched cards, particularly if they are made of flexible sheet material.

The inhibiting plates may be made entirely of metal. Alternatively, they may be of a non-metallic non-magnetic material impregnated with permanent-magnetic material in powder form, the latter material being, for example, a ferrite.

The effect of the inhibiting plate can be greatly enhanced by the use of a continuous plate to act as a backing plate, said plate being permanently magnetized in the direction opposite to that of the inhibiting plate and juxtaposed to the assembly of inhibiting plate and core array so as to be placed close to the inhibiting plate or in contact therewith on the side remote from the cores or placed close to the cores or in contact therewith on the side remote from the inhibiting plate.

If such a backing plate is used, it may be made of the same material as the inhibiting plate.

Embodiments of the invention will now be described by way of example with reference to the diagrammatic drawing, in which.

Figure 1:
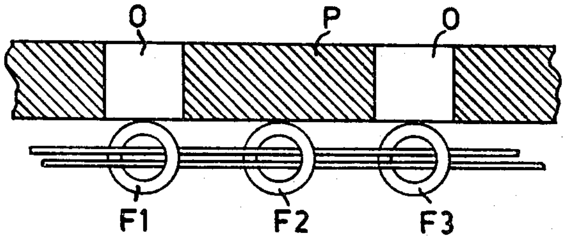
FIGURE 1 shows a simple embodiment as a fragmetary section taken in a plane normal to the matrix plane (wires normal to the plane of the drawing are omitted for simplicity).

A simple plate and core arrangement is shown as an enlarged fragmentary cross-section in FIGURE 1 of the drawing where cores F1 and F3 are inhibited by the flux concentrated at holes O (as in FIGURE 2) in the plate P while core F2 is free to operate owing to the comparitively weak field of the plate at points distant from its holes or edges.

Figure 2:
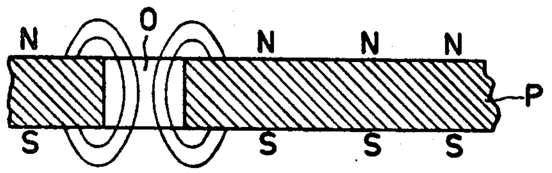
FIGURE 2 shows the form of the field configuration of the inhibiting plate when used alone.
Figure 3:
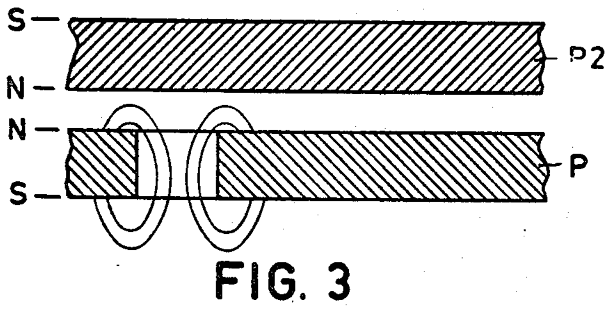
FIGURE 3 shows the type of field distortion which occurs when a backing plate is added.

As aforesaid, the effect of the magnetized plate can be greatly enhanced by the provision of a continuous plate to act as a backing plate, said plate being permanently magnetized in the direction opposite to that of the inhibiting plate and being placed close to the inhibiting plate or in contact therewith on the side remote from the cores or placed close to the cores or in contact therewith on the side remote from the inhibiting plate. Assuming the first alternative, since the backing plate is magnetized with a polarity opposite to that of the main plate (i.e. the adjacent faces of the two plates have the same polarity) the fringing flux at the apertures of the main plate is distorted in the manner shown by a comparison between FIGURES 2 and 3. FIGURE 2 shows the undistorted flux of the main inhibiting plate P, while FIGURE 3 shows the distortion which occurs as the backing plate P2 approaches the main plate. As a result of this distortion the flux density is increased on the side of the matrix where there is a hole and is decreased where there is no hole, the latter effect being due to partial cancellation between the fluxes of the two plates. There is a third advantage in that the edge effects of the two plates tend to cancel each other so that the plates do not have to extend so far or at all beyond the edges of the core array (typical overhang without a bucking plate is ¾″). Comparable effects take place when the backing plate is on the side of the matrix remote from the main plate, this arrangement operates slightly better and also makes it easier for the backing plate to be a permanent part of the matrix structure (the two plates are still magnetized in opposite directions).

For the same operative flux density the main or inhibiting plate can be thinner when used with a backing plate than it would be if used alone and this is advantageous in that interchangeable perforated plates can be stored in a smaller space.

As regards the material of the inhibiting plate (and of the backing plate if one is used), a first example is polyvinylchloride (PVC) sheeting impregnated with 78% or more (for example 85%) by weight of powder of a permanent-magnetic ferrite material available under the registered trademark "Magnadur." It is found that an inhibiting plate 1⁄16″ thick magnetized as required (i.e. with its poles on opposite faces) with a magnetized backing plate of equal thickness can readily inhibit annular ferrite cores of outer diameter 0.050″ of Mullard Type FX2140 of circular apertures of 0.055″ diameter are formed in the sheet at the places where cores are to be inhibited. What is more, two such plaes of 1⁄16″ thickness are more effective than an inhibiting plate of ⅛″ thickness used alone.

An even better material will now be given as a second example together with indications as to the method of manufacture. The material is a mixture of chlorosulphonated polyethylene and polyisobutylene, impregnated with 89% by weight of permanent-magnetic barium ferrite powder available under the registered trademark "Magnadur." After the material is mixed, the sheets are mouled under a pressure of 2 tons/square inch to achieve the necessary concentration of magnetic material; an added effect is to make them anisotropic, with the preferred direction of magnetisation perpendicular to the faces. It is found that a sheet 1⁄16″ thick magnetized as required (i.e. with its poles on opposite faces), together with an unperforated backing sheet 1⁄16″ thick, can readily inhibit annular ferrite cores of outer diameter 0.050″ of Mullar type FX2140 if circular apertures approximately 0.065″ in diameter are formed in the sheet at the places where cores are to be inhibited.

The above materials have the added advantage of flexibility.

In order to maintain the cores in accurate registration with the apertures of the inhibiting plate, it is found desirable to encapsulate the core array, and this may conveniently be done with a silicone silastometer.

To counteract the possible effects of stray pick-up within the matrix (both magnetic and capacitative) which might impair the signal-to-noise ratio, it is possible to use a two-core-perbit system. In this system two cores together represent each bit in a word and the sense wire threads both of these in a direction such that their outputs (and any stray induced signals) exactly cancel. If one of the cores is inhibited by the presence of an aperture in a magnetized plate an output of plus V is sensed while if the other core is inhibited an output of minus V is sensed. There is the advantage in this arrangement that the density of holes is approximately uniform over the whole area of the matrix and this permits more uniform flux distribution in the neighbourhood of the plate than is usually possible with a random distribution of holes.

The invention may be applied to arrangements in which the magnetic cores are constituted by thin film elements deposited on a base e.g. by evaporation.

As a modification the invention may be applied to matrices employing a plate of magnetic material having a regular pattern of holes where the cores are in effect constituted by the material surrounding said holes.

What is claimed is:

1. In combination, an information storage device having an array of magnetic cores arranged in rows and columns, and a permanently magnetized inhibiting plate juxtaposed with said array and having at least one aperture corresponding to the position within said array of at least one core to be rendered inoperative.

2. In combination, an information storage device having an array of magnetic cores arranged in rows and columns, and a permanently magnetized inhibiting plate juxtaposed with said array and having a plurality of apertures corresponding to the positions of a plurality of cores to be rendered inoperative, said plate having a magnetic north pole distributed over one of its faces and a magnetic south pole distributed over the other of its faces.

3. In combination, an assembly comprising an information storage device having an array of magnetic cores arranged in rows and columns and a permanently magnetized inhibiting plate juxtaposed with said array, and having at least one aperture corresponding to the position within said array of at least one core to be rendered inoperative; and a backing plate juxtaposed with said assembly, said backing plate being permanently magnetized in a direction opposite to that of the inhibiting plate.

4. In combination, an assembly comprising an information storage device having an array of magnetic cores arranged in rows and columns, and a permanently magnetized inhibiting plate juxtaposed with said array and having a plurality of apertures corresponding to the positions of a plurality of cores to be rendered inoperative, said plate having a magnetic north pole distributed over one of its faces and a magnetic south pole distributed over the other of its faces; and a backing plate juxtaposed with said assembly, said backing plate being permanently magnetized in a direction opposite to that of the inhibiting plate.

5. An information storage matrix employing an array of magnetic cores arranged in rows and columns in combination with a permanently magnetized inhibiting plate having an area equal to or greater than that of said array and having apertures corresponding to the cores which are to become inoperative, said plate having a north pole distributed over one of its faces with a south pole distributed over its other face and being arranged close to or in contact with the cores, and a continuous plate to act as a backing plate, said plate being permanently magnetized in the direction opposite to that of the inhibiting plate and being placed close to the inhibiting plate or in contact therewith on the side remote from the cores or placed close to the cores or in contact therewith on the side remote from the inhibiting plate.

6. The combination of claim 5 wherein the inhibiting plate is of a non-metallic, non-magnetic material impregnated with permanent magnetic material in powder form.

7. The combination of claim 6 wherein the material in powder form is a ferrite material.

8. The combination of claim 6 wherein the non-magnetic material is a mixture of chlorosulphonated polyethylene and polyisobutylene.

9. The combination of claim 5 wherein the cores are annular ferrite elements and the core array is encapsulated.

10. The combination of claim 5 wherein the core array comprises a plate of magnetic material having a regular pattern of holes.

11. The combination of claim 5 wherein the backing plate is of a non-metallic, non-magnetic material impregnated with permanent magnetic material in powder form.

12. The combination of claim 11 wherein the material in powder form is a ferrite material.

13. The combination of claim 11 wherein the non-magnetic material is a mixture of chlorosulphonated polyethylene and polyisobutylene.

References Cited

UNITED STATES PATENTS

| | | | |
|---|---|---|---|
| 3,060,411 | 10/1962 | Smith | 340—174 |
| 3,221,313 | 11/1965 | Gianola | 340—174 |
| 3,163,855 | 12/1964 | Bobeck | 340—174 |

STANLEY M. URYNOWICZ, Jr., *Primary Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,403,389 September 24, 1968

Allan Henry Ellson et al.

It is certified that error appears in the above identified patent and that said Letters Patent are hereby corrected as shown below:

Column 1, line 33, "preesnt" should read -- assignee of the present --; line 46, "matrivx" should read -- matrix --. Column 3, line 32, "of", first occurrence, should read -- if --; line 44, "mouled" should read -- moulded --; line 52, "Mullar" should read -- Mullard --.

Signed and sealed this 3rd day of February 1970.

(SEAL)
Attest:

Edward M. Fletcher, Jr.
Attesting Officer

WILLIAM E. SCHUYLER, JR.
Commissioner of Patents